(12) United States Patent
Wishart

(10) Patent No.: US 8,498,392 B2
(45) Date of Patent: Jul. 30, 2013

(54) METHOD AND A SYSTEM FOR ESTABLISHING A COMMUNICATION CHANNEL BETWEEN A PREDETERMINED NUMBER OF SELECTED DEVICES AND A DEVICE AND A SERVER ARRANGED FOR USE IN THE SYSTEM

(75) Inventor: Andrew Jonathan Miles Wishart, Stelling Minnis (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/520,937

(22) PCT Filed: Jan. 17, 2011

(86) PCT No.: PCT/IB2011/050187
§ 371 (c)(1),
(2), (4) Date: Jul. 6, 2012

(87) PCT Pub. No.: WO2011/089543
PCT Pub. Date: Jul. 28, 2011

(65) Prior Publication Data
US 2013/0101104 A1 Apr. 25, 2013

(30) Foreign Application Priority Data
Jan. 20, 2010 (EP) .................................. 10151168

(51) Int. Cl.
*H04M 1/56* (2006.01)
*H04M 15/06* (2006.01)
*G06F 15/16* (2006.01)

(52) U.S. Cl.
USPC ................... 379/142.05; 379/93.02; 379/145; 379/207.11; 709/227; 709/228; 709/229

(58) Field of Classification Search
USPC ......... 379/93.02, 93.03, 114.14, 130, 142.05, 379/142.06, 142.17, 143, 145, 154, 155, 379/183, 184, 187, 188, 199, 207.11, 207.13, 379/211.01; 709/202, 203, 219, 227, 228, 709/229
See application file for complete search history.

(56) References Cited

U.S. PATENT DOCUMENTS
7,506,057 B2 3/2009 Bigioi et al.
(Continued)

FOREIGN PATENT DOCUMENTS
GB 2400527 A 10/2004
WO 2008129431 A2 10/2008

OTHER PUBLICATIONS
Kim et al: "Touch and Share: Intuitive Peer Selection"; PERMID08, 2004, pp. 1-4.
(Continued)

*Primary Examiner* — Binh Tieu

(57) ABSTRACT

A method for establishing a communication channel (17) between a predetermined number of selected devices (3;5). Each of the devices has its own identity. The establishing of the communication channel is done by a pairing via a server (1). Said devices have a pairing operational mode and a communication operational mode. The method comprises the steps of: —setting each of the devices in the pairing operational mode, —agreeing on the choice of a pairing signal (19a;19b), —selecting the agreed upon pairing signal (19a) on each of the devices, which devices transmit their identity and the agreed upon pairing signal (19a) to the server (1), —if the server (1) in a predetermined time interval determines that more than the predetermined number of selected devices have transmitted the agreed upon pairing signal (19a; 19b) than repeating the above second and third steps, wherein a next pairing signal is agreed upon, until the server (1) determines that only the predetermined number of selected devices have transmitted an identical sequence of pairing signals (19a; 19b), —establishing the communication channel (17) between the devices by the server (1), and —setting each of the devices in the communication operational mode. The achieved communication channel is very secure. A system comprises a server (1) and a predetermined number of selected devices (3;5), wherein during use a communication channel (17) between the first device (3) and the second device (5) is established via the server (1) according to the method of the invention.

9 Claims, 1 Drawing Sheet

U.S. PATENT DOCUMENTS

| | | | |
|---|---|---|---|
| 7,792,970 B2* | 9/2010 | Bigioi et al. | 709/227 |
| 7,962,629 B2* | 6/2011 | Bigioi et al. | 709/227 |
| 8,195,810 B2* | 6/2012 | Bigioi et al. | 709/227 |
| 8,295,766 B2* | 10/2012 | Zimbric et al. | 455/41.2 |
| 2007/0168468 A1* | 7/2007 | Stogel et al. | 709/219 |
| 2008/0113618 A1 | 5/2008 | De Leon et al. | |
| 2009/0061769 A1* | 3/2009 | Zimbric et al. | 455/41.2 |
| 2010/0306662 A1* | 12/2010 | Stogel | 715/736 |
| 2011/0060836 A1* | 3/2011 | Bigioi et al. | 709/227 |
| 2011/0276698 A1* | 11/2011 | Bigioi et al. | 709/227 |

OTHER PUBLICATIONS

Jakobsson et al: "Security Weaknesses in Bluetooth"; Topics in Cryptology-CT-RSA, LNCS 2020, 2001, pp. 176-191.

* cited by examiner

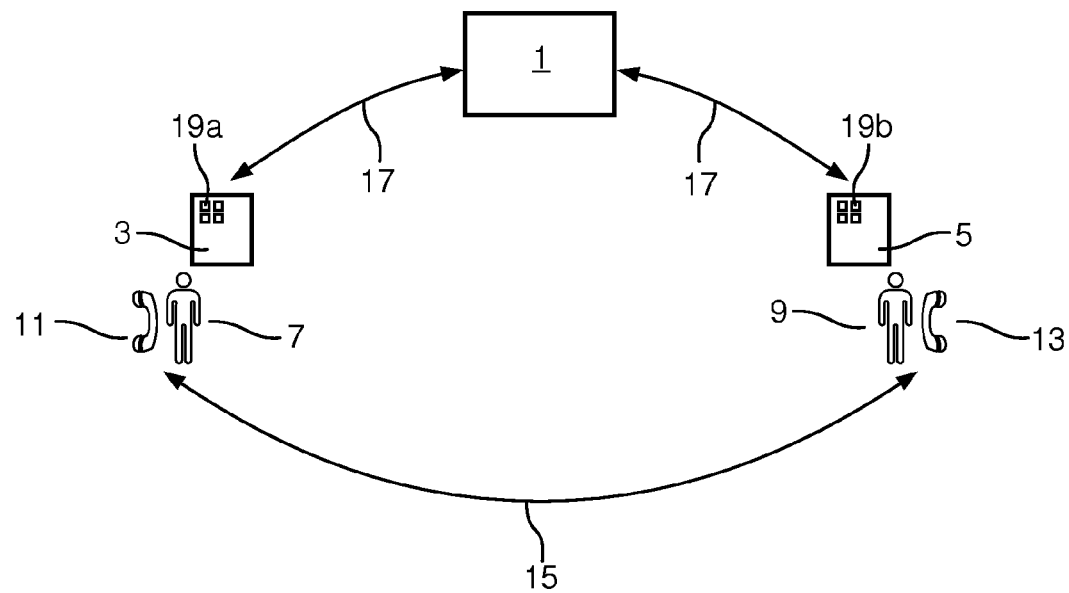

METHOD AND A SYSTEM FOR ESTABLISHING A COMMUNICATION CHANNEL BETWEEN A PREDETERMINED NUMBER OF SELECTED DEVICES AND A DEVICE AND A SERVER ARRANGED FOR USE IN THE SYSTEM

FIELD OF THE INVENTION

The invention relates to a method for establishing a communication channel between a predetermined number of selected devices.

The invention further relates to a system for establishing a communication channel between a predetermined number of selected devices. The invention also relates to a device and a server arranged for use in said system.

BACKGROUND OF THE INVENTION

A known method for establishing a communication between two devices via a server is based on using a unique identifier. The devices have each a touch screen or a keyboard for entering the unique identifier. In order to establish the communication the same unique identifier is entered to each of the two devices and each of the two devices transmits the unique identifier to the server. When the server receives the unique identifier from the two devices, the server establishes the communication between them.

The known method has a security problem. Since the unique identifier is entered via the touch screen or the keyboard, there is a risk that an unwanted third party will observe the entering of the unique identifier, whereby the unique identifier is compromised. Once compromised, the unique identifier can be used by the third party to establish unwanted communication with one of the two devices.

SUMMARY OF THE INVENTION

It is an object of the present invention to provide a method and a system which solve the above mentioned security problem.

In one aspect of the invention this object is achieved with the method for establishing a communication channel between a predetermined number of selected devices according to the invention as defined in Claim 1. Each of the devices has its own identity. The communication channel is established by pairing via a server. Said devices each have a pairing operational mode and a communication operational mode. The method according to the invention comprises the steps of:
  setting each of the devices in the pairing operational mode,
  agreeing on the choice of a pairing signal,
  selecting the agreed upon pairing signal on each of the devices, which devices transmit their identity and the agreed upon pairing signal to the server,
  if the server in a predetermined time interval determines that more than the predetermined number of selected devices have transmitted the agreed upon pairing signal than repeating the above second and third steps, wherein a next pairing signal is agreed upon, until the server determines that only the predetermined number of selected devices have transmitted an identical sequence of pairing signals,
  establishing the communication channel between the devices by the server, and
  setting each of the devices in the communication operational mode.

Differently from the known method, the method according to the invention does not use a single unique identifier, which as explained above provides a relatively poor security, for establishing the communication between the predetermined number of selected devices. Instead, a pairing signal is agreed upon, selected on the devices and transmitted by the devices to the server. The server receives in the predetermined time interval this pairing signal from each of the selected devices and when the server detects that the predetermined number of devices having sent the agreed upon pairing signal the server concludes that the connection between these devices should be established. In this case pairing is finished after a single pairing signal. Agreeing on a next pairing signal and selecting that pairing signal on the devices and transmitting to the server is repeated until the server determines that only the predetermined number of devices have transmitted an identical sequence of pairing signals. In this case pairing is finished after a set of sequential pairing signals. So, instead of using the single unique identifier, the single pairing signal or the set of sequential pairing signals is agreed upon and used. Such pairing signal or set of sequential pairing signals can be different each time when the predetermined number of devices are establishing the communication channel since the choice of the pairing signal is each time agreed upon independently from each other. The method according to the invention is very secure since the set of sequential pairing signals is variable and it is subject to an independent agreement. Consequently the achieved communication channel is very secure.

The server can be implemented among others as an electronic processor device, for example a microprocessor or a personal computer, running adequate software, i.e. a program.

According to a preferred embodiment the predetermined number of selected devices is two, viz. a first device and a second device. The first device has a first identity and the second device has a second identity. This variant of the method according to the invention comprises the steps of:
  setting the first device and the second device in the pairing operational mode,
  agreeing on the choice of a pairing signal,
  selecting the agreed upon pairing signal on the first device, which transmits its identity and the pairing signal to the server and selecting the agreed upon pairing signal on the second device, which transmits its identity and the pairing signal the server,
  if the server in a predetermined time interval determines that more than two devices have transmitted the agreed upon pairing signal than repeating the above second and third steps, wherein a next pairing signal is agreed upon, until the server determines that only two device have transmitted an identical sequence of pairing signals,
  establishing the communication channel between the first device and the second device by the server, and
  setting the first device and the second device in the communication operational mode.

Similarly to establishing the communication channel between two devices, the method can be used for establishing the communication channel between more than two devices. Consequently the server should be configured or parameterized properly in order to support pairing of a particular predetermined number of devices.

An embodiment of the method according to the invention has the feature that agreeing on the choice of the pairing signal is done via a direct communication channel. For example, the direct communication channel can be a telephone or an e-mail communication channel. So users of the devices will use a phone or a mobile phone when agreeing on the sequence of the pairing signals. The advantage of this embodiment is that agreeing on the pairing signal can be done when the devices are located on mutually different locations, for example in different rooms or in different buildings.

Another example of the direct communication channel is internet. The users of the devices can use for example one of the commercially available internet chat programs when agreeing on the pairing signal.

An embodiment of the method according to the invention has the feature that the pairing signal to be selected on the devices is offered by the server. The server offers a set, for example four, of pairing signals to users of the two devices and the users of the devices each time agree upon and select the agreed upon pairing signal.

The set of pairing signals can also be offered by the devices themselves. Since the users must be able to agree upon and choose the agreed upon pairing signal on each of the devices, the offered set of the pairing signals must be the same on all devices. One possibility is that all devices have the same predefined set of the pairing signals.

An embodiment of the method according to the invention has the feature that the pairing signal represents an image. For example users of the devices will be offered to choose one of four images provided by the server or by the devices. The users agree upon which image to select and each of them selects the same image on the devices that the particular users use. The advantage of such embodiment is that the users can easily and unambiguously agree upon on images to be selected on the devices.

In another aspect of the invention the said object is achieved with the system as defined in claim 7. The system according to the invention comprises a server and a predetermined number of selected devices, wherein during use a communication channel between the selected devices is established via the server according to the method of the invention. The system according to the invention has benefits similar to the benefits of the method according to the invention.

The invention also relates to a device and a server arranged for use in said system as defined in claims 8 and 9 respectively.

BRIEF DESCRIPTION OF THE DRAWINGS

In the following, the invention and further aspects will be described, by way of example, and explained hereinafter, using the following figure:

FIG. 1 Schematically shows an exemplary embodiment of the system according to the invention.

DETAILED DESCRIPTION OF THE EMBODIMENTS

In the following description of the preferred embodiments, reference is made to the accompanying drawing which forms a part thereof. Specific embodiments, in which the invention may be practiced, are shown in the following description by a way of illustration. It is also understood that other embodiments may be utilized and structural changes may be made without departing from the scope of the present invention. It is noted that the same reference signs will be used for indicating the same or similar parts in the several embodiments.

FIG. 1 schematically shows an exemplary embodiment of the system according to the invention. In order to establish a communication channel 17 between a first device 3 and a second device 5, a first user 7 operating the first device will set the first device in the pairing operational mode and a second user 9 will set the second device in the pairing operational mode. The devices can be among others a picture player, a video player, a chat device, a music player, a personal computer, a laptop, a smart phone, a mobile phone or any combination of the previous. The devices can exchange or share information and a content with each other after establishing the communication channel 17. A server offers a set of the identical pairing signals 19a;19b to the users 7;9 via user interfaces, for example a touch screen or a keyboard of the device, of the first and second devices, respectively. The users 7;9 establish a direct phone connection 15 using phones 11;13 with each other and agree upon which pairing signal to select. Other examples of the direct connection between users are an e-mail, a chat via internet, etc. The users 7;9 select the agreed upon pairing signal on the devices 3;5 and these devices transmit the pairing signal to the server. The server will get these inputs within a predetermined period of time and check how many devices send the agreed upon pairing signal. If only two devices are detected the pairing process is finished and the server will establish the communication channel between these two devices 3;5. If more than two devices are detected by server, the server will offer a new set of the identical pairing signals 19a;19b to the users 7;9 via the user interfaces of the first and the second devices respectively. The previous steps will repeat till only two devices with the identical selected pairing signals remain. The server concludes then that the communication between these devices should be established and the server establishes the communication channel between these two devices. Once the communication channel is established a secure communication is achieved and the devices 3;5 can safely exchange or share information and the content, for example text messages, images, videos, music etc., with each other.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawing, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

LIST OF REFERENCE NUMERALS

1 a server
3 a first device
5 a second device
7 a first user
9 a second user
11 a first phone
13 a second phone
15 a direct communication channel
17 a communication channel
19 pairing signals

The invention claimed is:

1. A method for establishing a communication channel (17) between a predetermined number of selected devices (3;5) each having its own identity, by pairing via a server (1), said devices each having a pairing operational mode and a communication operational mode, wherein the method comprises the steps of:

setting each of the devices in the pairing operational mode,
agreeing on the choice of a pairing signal (19a;19b),
selecting the agreed upon pairing signal (19a) on each of the devices, which devices transmit their identity and the agreed upon pairing signal (19a) to the server (1), repeating the above second and third steps, if the server (1) in a predetermined time interval in a predetermined time interval determines that more than the predetermined number of selected devices have transmitted the agreed upon pairing signal (19a;19b), wherein a next pairing signal is agreed upon, until the server (1) determines that only the predetermined number of selected devices have transmitted an identical sequence of pairing signals (19a;19b), establishing the communication channel (17) between the devices by the server (1), and setting each of the devices in the communication operational mode.

2. The method for establishing the communication channel (17) between the predetermined number of selected devices (3;5) as claimed in claim 1, wherein the predetermined number of selected devices is two.

3. The method for establishing the communication channel (17) between the predetermined number of selected devices (3;5) as claimed in claim 1, wherein agreeing on the choice of the pairing signal (19a;19b) is done via a direct communication channel (15).

4. The method for establishing the communication channel (17) between the predetermined number of selected devices (3;5) as claimed in claim 3, wherein, the direct communication channel (15) comprises a telephone or an e-mail communication channel.

5. The method for establishing the communication channel (17) between the predetermined number of selected devices (3;5) as claimed in claim wherein in the third step, the pairing signal (19a;19b)) selected on the devices (3;5) is offered by the server (1).

6. The method for establishing the communication channel (17) between the predetermined number of selected devices (3;5) as claimed in claim 1, wherein the pairing signal (19a; 19b) represents an image.

7. A system comprising a server (1) and a predetermined number of selected devices (3;5), wherein during use a communication channel (17) between the selected devices (3;5) is established via the server (1) by the method as claimed in claim 1.

8. A device (3;5) arranged for use, as one of the selected devices (3;5), in the system according to claim 7.

9. A server (a) arranged for use in the system according to claim 7.

\* \* \* \* \*